United States Patent [19]

Williams

[11] Patent Number: 5,074,050
[45] Date of Patent: Dec. 24, 1991

[54] SHEET-CONTACTING THICKNESS GAUGES
[75] Inventor: Paul Williams, Columbus, Ohio
[73] Assignee: AccuRay Corporation, Columbus, Ohio
[21] Appl. No.: 138,987
[22] Filed: Dec. 29, 1987
[51] Int. Cl.⁵ .............................................. G01B 7/06
[52] U.S. Cl. .............................. 33/501.03; 33/501.04; 73/159; 324/229
[58] Field of Search .............. 33/147 L, 147 N, 143 L, 33/501.02, 501.03, 501.04; 324/229–231; 162/263; 73/159

[56] References Cited

U.S. PATENT DOCUMENTS

| 2,221,516 | 11/1940 | Hathaway | 324/231 |
| 2,266,620 | 12/1941 | Coffman | 33/147 N |
| 3,411,075 | 11/1968 | Kahoun | 324/231 |
| 3,513,555 | 5/1970 | Vachon | 324/231 |
| 3,525,929 | 8/1970 | Mounce | 324/231 |
| 3,703,097 | 11/1972 | Kilpatrich et al. | 33/147 L |
| 3,818,327 | 6/1974 | Alexander | 33/147 L |
| 3,828,248 | 8/1974 | Wennerberg | 324/231 |
| 4,107,847 | 8/1978 | Typpo et al. | 33/147 L |
| 4,134,211 | 1/1979 | Typpo et al. | 33/147 L |
| 4,434,649 | 3/1984 | Williams | 324/229 |

Primary Examiner—William A. Cuchlinski, Jr.
Attorney, Agent, or Firm—Richard H. Berneike

[57] ABSTRACT

A contacting thickness gauge comprising a unique surface follower (46). The bottom surface (56) of the surface follower (46) has both contacting areas (64,66) and non-contacting areas (62). The surface follower (46) is in substantially continuous contact with a moving sheet (2) and embodies an electrically conductive target having a target surface that intersects a magnetic field but is substantially free from contact with the sheet during normal operation. The surface follower (46) is designed to minimize damage to the sheet (2) that would otherwise occur from contact between the surface follower and a protruberance of the sheet, and to preserve the characteristics of the target surface.

3 Claims, 2 Drawing Sheets

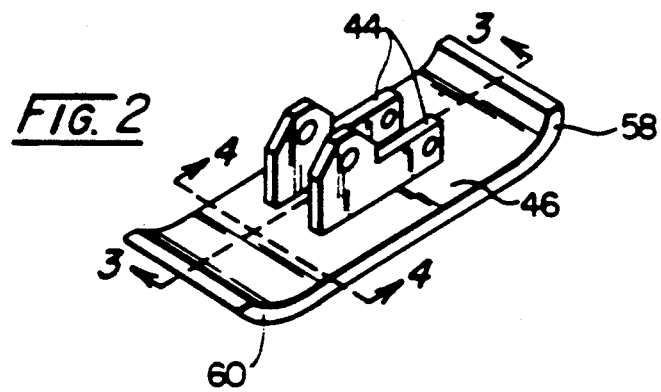
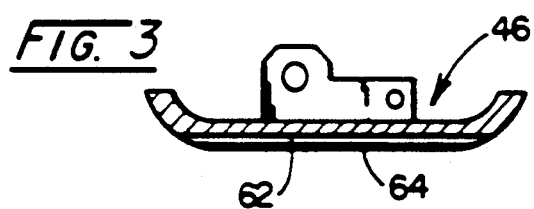
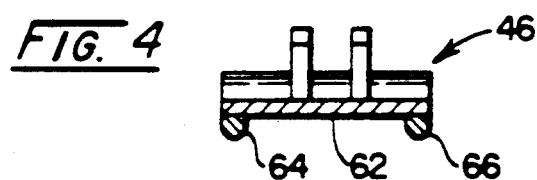
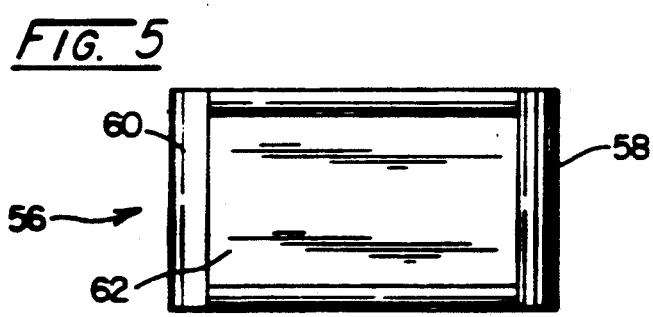

SHEET-CONTACTING THICKNESS GAUGES

BACKGROUND OF THE INVENTION

1. Technical Field

This invention pertains to thickness gauges for use in measuring the thickness of a moving sheet of material such as a paper web. Such gauges may be broadly classified as contacting or non-contacting. This invention relates to the former class. More particularly, the invention relates to gauges of the former class which employ surface followers (sheet-contacting components of contacting thickness gauges) designed to mimimize damage to the sheet and to preserve the surface characteristics of electrically conductive proximeter targets employed in such gauges.

2. Discussion of Related Art

Thickness gauges, also known as caliper gauges, are well known in the field of sheet-process measurement. Typical contacting thickness gauges are described in U.S. Pat. Nos. 3,525,929 Mounce, 3,828,248 Wennerberg, 4,107,847 Typpo et al., and 4,134,211 Typpo et al.

These gauges typically sense the thickness of the sheet by incorporating some design in which the distance between a proximeter probe (typically, an induction coil forming a part of a proximeter circuit) and a proximeter target (typically comprising a piece of ferrite or other electrically-conductive material, or a coil) varies with the thickness of the sheet. Changes in thickness are determined from changes in electrical signals produced in the associated circuit, which result from the variations in distance. The variation in distance between the probe and the target is effected by the movement of one or more surface followers which maintain substantially continuous contact with the sheet.

Various means have been adopted in attempts to minimize damage resulting from contact between the surface follower and the sheet. The surface followers are typically rounded or beveled, and may be secured to bellows, diaphragms, and/or mechanical linkage so that the follower can move in response to impact with a passing protruberance in the sheet.

Where the surface follower serves as the proximeter target (as in U.S. Pat. No. 3,828,248, for example), the continuous contact between its sheet-contacting surface and the sheet gradually wears away the contacting surface. This can be expected to change the surface characteristics of the surface follower in what, in all likelihood, will be a non-uniform manner. The change in surface characteristics can in turn be expected to produce gradual changes in the paths of eddy currents flowing in the target, thus producing a source of error in the thickness measurement.

SUMMARY OF THE INVENTION

This invention provides contacting thickness gauges of the type wherein electrical signals indicating the distance between an electrically conductive coil and an electrically conductive target are continually produced, from which signals thickness measurements for a moving sheet of material are continually derived. A thickness gauge in accordance with the invention employs a surface follower that embodies the target and maintains continuous contact with the sheet during continuous manufacture thereof.

In one aspect of the invention, the surface follower is designed to prevent the target from contacting the sheet during normal operation so that the target maintains its surface characteristics even though the target may be positioned very close to the moving sheet. The bottom surface of the surface follower has both contacting and non-contacting areas. A non-contacting area is recessed in relation to the contacting area and includes a surface of the target for which surface characteristics are to be maintained.

In another aspect of the invention, the contacting area of the bottom surface comprises two parallel runners separated by a non-contacting area. With this aspect of the invention, the horizontal stability of the surface follower is maintained while the likelihood of damage from contact between the surface follower and a protruberance in the sheet is minimized.

BRIEF DESCRIPTION OF THE DRAWINGS

FIG. 2 is a perspective view of the surface follower illustrated in FIG. 1.

FIGS. 3 and 4 are sectional views taken along lines 3—3 and 4—4, respectively, of FIG. 2.

FIG. 5 illustrates the bottom surface of the surface follower in accordance with the preferred embodiment.

DESCRIPTION OF THE PREFERRED EMBODIMENT

Figure 1:
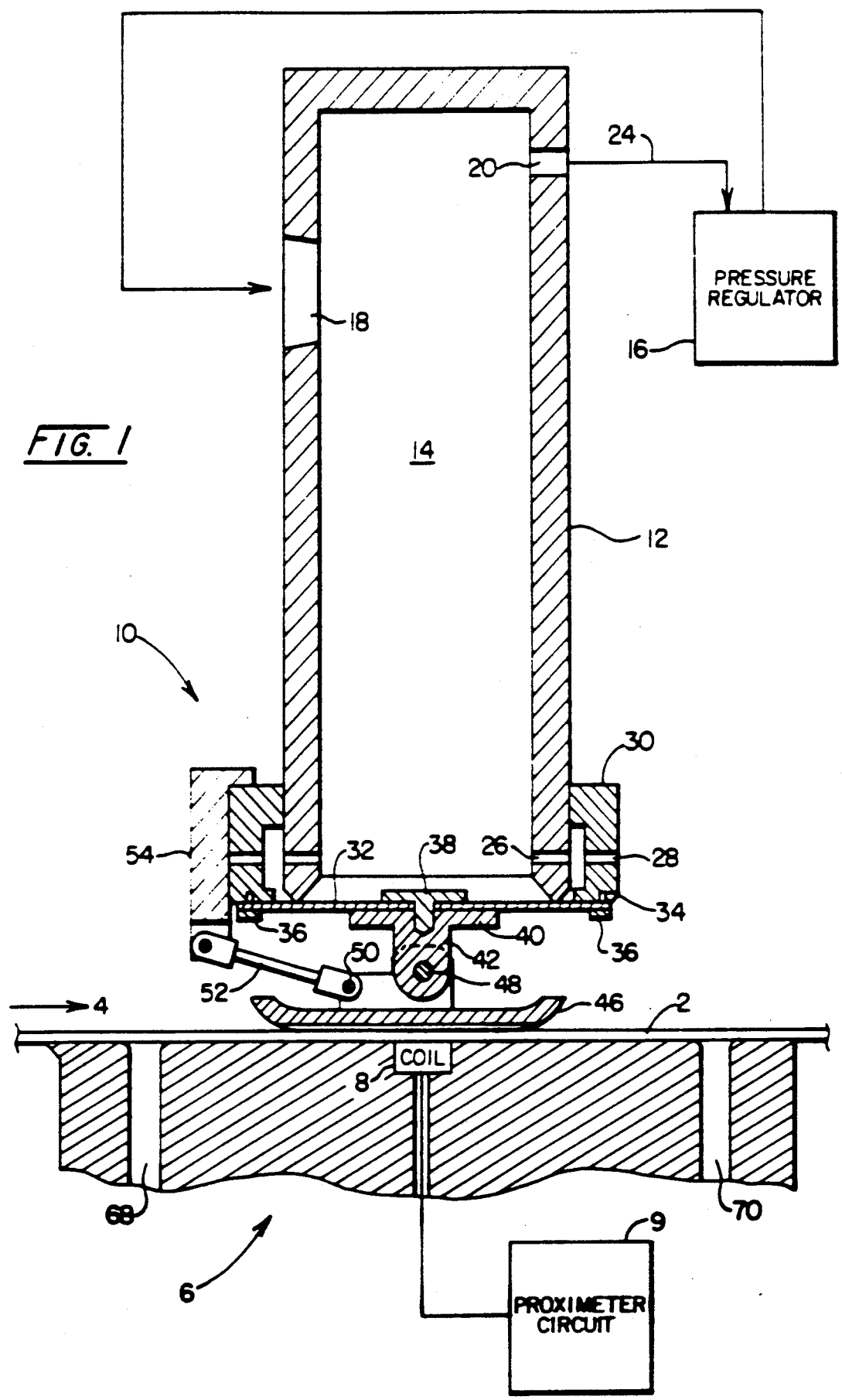
FIG. 1 is a partially sectional, partially schematic illustration of a contacting thickness gauge operating in accordance with the preferred embodiment of the invention.

There is shown in FIG. 1 a sheet 2 of material (In a typical application, the material is paper.) moving during its continuous manufacture in the direction indicated by the numeral 4. A first gauging head 6 is disposed on one side of the sheet 2 and contains an electrically conductive coil 8. The coil 8 is part of a conventional proximeter circuit 9 which produces electrical signals that vary with the distance between the coil 8 and an electrically conductive target.

A second gauging head 10 is disposed on the opposite side of the sheet 2. The second gauging head 10 is generally cylindrical in shape and comprises a housing 12 having an air-pressurizable internal chamber 14. The chamber 14 is in fluid communication with a conventional pressure regulator 16 via an air inlet 18 and an air outlet 20, as indicated by lines 22 and 24, so that the air pressure therein can be maintained at a substantially constant level. Bleed orifices, as at 26 and 28, are provided in the housing 12 and in a retainer head 30 to permit more rapid escape of the air from the chamber 14 when the desired internal pressure is exceeded.

The retainer head 30 is generally cylindrical in shape and is secured to the housing 12 by a conventional twist-lock arrangement (not shown) to facilitate disassembly for purposes of maintenance. A resilient, deformable diaphragm 32 positioned in generally parallel relation to the sheet 2 is tightly secured to the bottom surface of the retainer head 30 by a plurality of screws (as at 34) driven through a retainer ring 36, the diaphragm, and into the housing 12. The diaphragm 32 is disc-shaped and it is an outer ring portion thereof that is secured to the second gauging head 10.

An inner circular portion of the diaphragm 32 forms the bottom wall of the internal chamber 14. A flat screw 38 is driven through the center of the diaphragm 32 and into a tapped connecting member 40. A lug portion 42 of the connecting member 40 is positioned between a pair of lugs 44 (FIG. 2) brazed to a surface follower 46. The lugs 42,44 have aligned holes (as at 48) that are appropriately sized so that suitable fastening means may be used to effect a tight fit that prevents rotation of the center lug with respect to the outer lugs. Thus, the surface follower 46 is tightly supported from the second gauging head 10 via the diaphragm 32 at a first position. In addition, a pin (not shown) driven through the indicated holes of the pair of lugs 44 and through a hole 50 of slightly larger diameter in a pivot arm 52 pivotally supports the surface follower 46 from the second gauging head 10 at a second position. The opposite end of the pivot arm 52 is pivotally supported in similar fashion from an arm-mounting member 54, which in turn is rigidly secured to the retainer head 30.

The above-described arrangement of the surface follower 46 with respect to the second gauging head 10 provides considerable freedom of movement for the follower when it encounters a protuberance in the sheet 2, and provides means for controlling the pressure exerted by the surface follower on the sheet. This arrangement is similar in some respects to the arrangement described in Pat. No. 4,134,211, and in others to the arrangement described in U.S. Pat. No. 3,828,248.

Referring now to the features of the surface follower 46 and to FIGS. 3 and 5 in particular, the bottom surface 56 of the follower has upwardly curved upstream and downstream portions 58,60 to assist in preventing damage to the sheet 2. During normal contact of the surface follower 46 with the sheet 2, there is substantially no contact between the sheet and these portions. "Normal contact", as used herein, is the contact occuring between the surface follower 46 and the sheet 2 during normal operation wherein the follower is riding on the moving sheet and is not undergoing contact with a shive, protruding hard spot, or the like (a "protruberance").

FIG. 5 illustrates the bottom surface 56 of the surface follower in accordance with the preferred embodiment. Between the upstream and downstream portions 58,60 is a contacting area (the shaded area) that is in continuous contact with the sheet 2 during normal contact. There is also a non-contacting area 62 that is recessed in relation to the contacting area and is typically parallel to the sheet 2 during measurement. A central portion of the non-contacting are 62 is positioned over the coil 8. Thus, a magnetic field produced by the coil 8 intersects at least a portion of the non-contacting area 62, which portion includes a surface of an electrically conductive target (target surface). In the preferred embodiment, the surface follower 46 is constructed primarily of a lightweight, electrically conductive material such as an aluminum alloy so that the target is an integral portion of the follower.

Alternatively, the target may be installed in the surface follower 46 so that it does not move with respect thereto, and so that its bottom surface does not contact the sheet 2, thus forming a recessed non-contacting area positioned over the coil 8, which area-may be in addition to, or coincident with, another recessed non-contacting area such as the area 62 indicated in the drawing. In either case, the surface follower 46 embodies the target— —meaning that the target is either attached to, installed in, or integral with the follower so that there is no relative motion between the two—but is designed to prevent contact between the sheet 2 and the target surface that intersects the magnetic field.

The contacting area preferably comprises the sheet-contacting surfaces of two parallel runners 64,66 extending longitudinally in the direction of motion of the sheet 2. The runners 64,66 are separated by a non-contacting area 62 and are preferably curved along their transverse extensions, as indicated in FIG. 4, to minimize friction. It is believed that the use of the runners 64,66 as shown will reduce the likelihood of damage to the sheet 2 from protruberances which are so positioned that they pass between the runners.

In a constructed prototype, the surface follower 46 was made entirely of aluminum 2024 except for the runners 64,66. The runners 64,66 were made of chromium oxide and were applied by flame-spray coating to the aluminum substrate. The chromium oxide was provided to retard wearing of the contacting area. The clearance between the contacting area and the non-contacting area 62 was approximately 0.25 millimeters.

In use, the first and second gauging heads 6,10 are installed in a conventional sheet-traversing structure such as that illustrated in FIG. 1 of U.S. Pat. No. 3,828,248, for example, so that thickness measurements may be derived for a plurality of zones extending across the sheet 2 in a direction transverse to its direction of motion 4.

Means for maintaining the sheet 2 in a flat condition as it passes between the gauging heads 6,10 should be employed to minimize error otherwise resulting from wrinkes or flutter. This may include partial vacuum channels 68,70 as indicated, forced air directed from the second gauging head 10, guide rails, or other suitable means.

Although the invention has been described in accordance with the preferred embodiment thereof, the description is not intended to restrict the scope of the invention beyond that defined by the following claims and their equivalents.

What is claimed is:

1. A contacting thickness gauge for measuring the thickness of a sheet of material moving along a sheet path including a coil which produces a magnetic field disposed on one side of said sheet path in a fixed position and an electrically conductive surface follower target means disposed on the opposite side of said sheet path generally in alignment with said coil and wherein the thickness measurements are derived from electrical signals indicating the distance between said coil and said surface follower target means, said surface follower target means comprising a target surface and two parallel runners extending longitudinally along the direction of said sheet path and extending out from the target surface whereby said runners comprise portions of said surface follower target means which contact and follow said sheet and whereby said target surface comprises a non-contacting area spaced from said sheet by said runners.

2. A contacting thickness gauge as recited in claim 1 wherein said runners are separated by said non-contacting target surface.

3. A contacting thickness gauge as recited in claim 1 wherein the transverse cross-section of the sheet-contacting surface of said runners is curved.

* * * * *